Patented July 13, 1943

2,324,113

UNITED STATES PATENT OFFICE

2,324,113

METHOD OF MAKING DEXTROSE

Herman H. Schopmeyer, Hammond, Ind., and Wellbourne A. Mollison, Chicago, Ill., assignors to American Maize-Products Company, a corporation of Maine No Drawing. Application July 1, 1941, Serial No. 400,690

4 Claims. (Cl. 127—34)

This invention relates to dextrose and the method of making it. The invention relates, more particularly, to dextrose in the form of solid particles of abnormally high rate of solution in water.

In the conventional manufacture of dextrose, corn starch or other starch is converted by heating in the presence of a small proportion of acid to give a starch conversion liquor of high dextrose equivalent. This liquor is neutralized, refined, and evaporated to give a refined syrup of desired concentration. The syrup is then subjected to crystallization in very special manner so as to give crystals of dextrose. These crystals are separated from the mother liquor, washed, and dried. They consist largely of alpha-dextrose monohydrate.

Although the dextrose so made is very soluble in water, it has been found by Buchanan (Chemical Abstracts 32, 2240, 1938) that dextrose at low temperatures dissolves in water more slowly than sucrose. This observation is especially important in view of the use of dextrose in making ice-cream and other products at low temperatures.

The present invention provides a dextrose that dissolves in water much more rapidly than does ordinary dextrose. Twenty parts by weight of our new dextrose dissolves in 100 parts of water at 60° F. in 35 seconds, as compared to 225 seconds required for dissolving the same quantity of ordinary dextrose under comparable conditions.

The invention comprises the herein described product and method and, more especially, the product resulting from the method of spray-drying a solution of dextrose at a final temperature that is not substantially below 140° F. or above the melting point of the product, namely, about 150° F., and quickly cooling the resulting dried dextrose so as to make a product of relatively very rapid rate of solution, the drying temperature being expressed as the temperature of the air in contact with the fine particles of sprayed material. In the preferred embodiment, the invention comprises preheating a concentrated dextrose syrup to a temperature of about 200° F. or higher but below the temperature of objectionable decomposition of the dextrose, as shown by discoloration or development of a non-dextrose taste, spraying the preheated syrup in the form of fine droplets into an air stream at a temperature of about 160 to 240° F. in such proportion that the heat of the air is adequate to dry the dextrose syrup without cooling the air to a final temperature appreciably below 140° F., and rapidly cooling the dried material to give solid stable particles of glassy dextrose.

Dextrose made as described consists of fine particles of strongly hygroscopic material. It is adapted, however, to be shipped and stored in moisture-proof bags without objectionable caking. The product dissolves in water in only a small fraction of the time required to dissolve alpha-dextrose under comparable conditions. It has the desirable properties of dextrose. It does not show mutarotation when the material is dissolved in water and the rotatory power noted at intervals, the lack of mutarotation being a distinction from pure beta-dextrose.

In an example of the practice of the invention, a commercial dextrose syrup of concentration corresponding to the specific gravity of 27.5° Bé. was rapidly preheated to a temperature of about 240° F. The preheated syrup was then atomized into a rapidly moving stream of air at a temperature of about 150° to 240° F. and preferably 160° to 200° F. A large volume of the air was used in proportion to the mass of the concentrated dextrose syrup, so that the temperature of the air passing from the spray-drying equipment was approximately 140° F. or above. There was thus obtained a dextrose in the form of fine glassy particles containing 1.2% of moisture.

In another example, commercial concentrated dextrose syrup of dextrose equivalent 93 to 94 was subjected to crystallization of dextrose in usual manner and the separated dextrose crystals were centrifuged to a moisture content of 14%. The centrifuged mass was then heated to cause melting of the dextrose in the water present in the centrifuged mass and additional water added in proportion to make the concentration of the resulting solution approximately 50 to 87 per cent and the density about 28° to 43° Baumé, as measured at 100° F. Solutions of densities outside this range may be used. At lower densities, however, there is an excessive amount of water to be evaporated. At much higher densities than 43° Bé. the solution is atomized only with difficulty. The solution of selected density was then preheated to raise the temperature to about 200 to 280° F. and spray-dried as described above with the production of solid particles of rapidly soluble material.

The dextrose solution to be spray-dried in making the rapidly soluble dextrose should be of purity not substantially below 92.5 as may be obtained in certain conversion mixtures at equilibrium. Purities ranging from 92.5 to approximately 100 are satisfactory as raw material for our method.

It will be understood that the details given are for the purpose of illustration and that variations within the spirit of the invention are intended to be included within the scope of the appended claims.

What we claim is:

1. In making dextrose of higher rate of solution in water than alpha-dextrose monohydrate, the method which comprises dissolving in water alpha dextrose monohydrate of purity not substantially below 92.5, spray-drying the solution to solid form at a final temperature not substantially below 140° or above 150° F., and promptly and rapidly cooling the dried product.

2. In making dextrose of higher rate of solution in water than alpha-dextrose monohydrate, the method which comprises dissolving alpha dextrose monohydrate of purity not substantially below 92.5 in water, preheating the solution to a temperature of at least about 240° F. and below the temperature of decomposition of dextrose, and then atomizing the solution into a stream of air at approximately 160° to 240° F., the proportion of the heated air being at least approximately equal to that required to supply the heat necessary to evaporate practically all the water from the syrup as the air is cooled to a temperature of 140° F. and the said alpha dextrose initially dissolved in water being of purity not substantially below 92.5.

3. The method described in claim 2 which includes promptly and rapidly cooling the resulting dried product.

4. In making dextrose of higher rate of solution in water than alpha dextrose monohydrate, the method which comprises forming a concentrated aqueous solution consisting essentially of alpha dextrose of purity not substantially below 92.5 dissolved in water, preheating the solution to a temperature of at least approximately 200° F., and quickly evaporating water from the solution to a moisture content not substantially above 3%, the evaporation being effected below the temperature of preheating of the solution and at a temperature not substantially below 140° F. or above the melting point of the product.

HERMAN H. SCHOPMEYER.
WELLBOURNE A. MOLLISON.